(12) United States Patent
Harmon et al.

(10) Patent No.: US 11,926,287 B2
(45) Date of Patent: Mar. 12, 2024

(54) FRONT TRUNK INCLUDING CLOSURE PROVIDING INCREASED HEADROOM AND SHADE

(71) Applicant: Ford Global Technologies, LLC, Dearborn, MI (US)

(72) Inventors: Michael John Harmon, Northville, MI (US); Hussain Z. Tajmahal, Detroit, MI (US); Benjamin Howard, Grosse Pointe Park, MI (US); Kathryn N. Cezar, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/892,279

(22) Filed: Aug. 22, 2022

(65) Prior Publication Data
US 2023/0391268 A1 Dec. 7, 2023

Related U.S. Application Data

(60) Provisional application No. 63/347,704, filed on Jun. 1, 2022.

(51) Int. Cl.
*B60R 5/02* (2006.01)
*B60R 11/02* (2006.01)
*B60R 19/52* (2006.01)
*B62D 25/10* (2006.01)
*B62D 25/12* (2006.01)
*B60R 11/00* (2006.01)

(52) U.S. Cl.
CPC ............ *B60R 5/02* (2013.01); *B60R 11/0229* (2013.01); *B60R 19/52* (2013.01); *B62D 25/105* (2013.01); *B62D 25/12* (2013.01); *B60R 2011/0036* (2013.01)

(58) Field of Classification Search
CPC .. B60R 5/04; B60R 5/02; B60R 5/041; B60R 19/52; B60R 13/011; B60R 13/013; B60R 2013/016; B60R 2011/0036; B62D 25/087; B62D 25/105
See application file for complete search history.

(56) References Cited

U.S. PATENT DOCUMENTS

| | | | |
|---|---|---|---|
| 5,197,560 A | 3/1993 | Oda et al. | |
| 5,692,792 A | 12/1997 | Klar | |
| 6,116,366 A | 9/2000 | Creswick et al. | |
| 7,536,748 B2 | 5/2009 | Renke et al. | |
| 10,480,239 B1 * | 11/2019 | Wisneski | B62D 25/12 |
| 10,633,033 B1 * | 4/2020 | Salter | B62D 25/12 |
| 10,717,471 B2 * | 7/2020 | Glickman | B60Q 3/30 |
| 10,730,441 B2 * | 8/2020 | Glickman | B60H 1/00271 |

(Continued)

*Primary Examiner* — Jason S Morrow
(74) *Attorney, Agent, or Firm* — Vichit Chea; Carlson, Gaskey & Olds, P.C.

(57) ABSTRACT

This disclosure relates to a front trunk including a closure providing increased headroom and shade. In some aspects, the techniques described herein relate to a motor vehicle, including: a front trunk establishing a cargo space; and a closure assembly configured to move between a closed position and an open position to selectively cover and uncover the front trunk, wherein the closure assembly includes a hood section and a grille section, wherein, when the closure assembly is not in the closed position, the grille section is rotatable relative to the hood section in a direction away from a ground surface.

20 Claims, 4 Drawing Sheets

(56) References Cited

U.S. PATENT DOCUMENTS

| | | | |
|---|---|---|---|
| 10,926,687 B2* | 2/2021 | Tadros | B60P 3/0255 |
| 10,926,705 B2 | 2/2021 | Hoffman et al. | |
| 11,448,002 B2* | 9/2022 | Lee | B60J 5/101 |
| 11,565,645 B2* | 1/2023 | Salter | B60P 3/341 |
| 2002/0026685 A1 | 3/2002 | Bjureblad et al. | |
| 2022/0177052 A1* | 6/2022 | Harmon | B60P 3/341 |
| 2023/0278501 A1* | 9/2023 | Gill | B60R 5/02 |
| | | | 296/37.5 |

* cited by examiner

FRONT TRUNK INCLUDING CLOSURE PROVIDING INCREASED HEADROOM AND SHADE

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a front trunk including a closure providing increased headroom and shade.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk establishing a cargo space; and a closure assembly configured to move between a closed position and an open position to selectively cover and uncover the front trunk, wherein the closure assembly includes a hood section and a grille section, wherein, when the closure assembly is not in the closed position, the grille section is rotatable relative to the hood section in a direction away from a ground surface.

In some aspects, the techniques described herein relate to a motor vehicle, wherein the grille section is rotatable relative to the hood section while the closure assembly is moving between the closed and open positions.

In some aspects, the techniques described herein relate to a motor vehicle, wherein the grille section is rotatable relative to the hood section about an axis adjacent a front edge of the hood section.

In some aspects, the techniques described herein relate to a motor vehicle, wherein the grille section is rotatable about an axis substantially parallel to the ground surface.

In some aspects, the techniques described herein relate to a motor vehicle, wherein, when the closure assembly is in the closed position, the grille section projects from the hood section at a first angle measured from an inner surface of the hood section to an inner surface of the grille section.

In some aspects, the techniques described herein relate to a motor vehicle, wherein the first angle is substantially 90°.

In some aspects, the techniques described herein relate to a motor vehicle, wherein, when the closure assembly is in the open position, the grille section projects from the hood section at a second angle greater than the first angle, wherein the second angle is measured from the inner surface of the hood section to the inner surface of the grille section.

In some aspects, the techniques described herein relate to a motor vehicle, wherein the second angle is greater than 90°.

In some aspects, the techniques described herein relate to a motor vehicle, wherein the second angle is less than 180°.

In some aspects, the techniques described herein relate to a motor vehicle, wherein the grille section is inclined at an acute angle above a plane extending parallel to a ground surface.

In some aspects, the techniques described herein relate to a motor vehicle, wherein the grille section is inclined at an angle of about 10° measured from the plane to the inner surface of the grille section.

In some aspects, the techniques described herein relate to a motor vehicle, wherein: a powered assembly is configured to cause the closure assembly to move from the closed position to the open position, and the powered assembly is also configured to cause the grille section to rotate from the first angle to the second angle as the powered assembly is causing the closure assembly to move from the closed position to the open position.

In some aspects, the techniques described herein relate to a motor vehicle, wherein: an electronic visual display is rotatably mounted to an underside of the hood section, and the powered assembly is also configured to cause the electronic visual display to rotate such that the electronic visual display is substantially perpendicular to a ground surface as the powered assembly is causing the closure assembly to move from the closed position to the open position.

In some aspects, the techniques described herein relate to a motor vehicle, wherein the motor vehicle is a battery electric vehicle.

In some aspects, the techniques described herein relate to a method, including: moving a closure assembly from a closed position to an open position to uncover a front trunk of a motor vehicle; and rotating a grille section of the closure assembly relative to a hood section of the closure assembly in a direction away from a ground surface when the closure assembly is not in the closed position.

In some aspects, the techniques described herein relate to a method, wherein: when the closure assembly is in the closed position, the grille section projects from the hood section at a first angle measured from an inner surface of the hood section to an inner surface of the grille section, and the step of rotating the grille section includes rotating the grille section such that the grille section projects from the hood section at a second angle greater than the first angle, wherein the second angle is measured from the inner surface of the hood section to the inner surface of the grille section.

In some aspects, the techniques described herein relate to a method, wherein the step of rotating the grille section occurs at least partially during the moving step.

In some aspects, the techniques described herein relate to a method, wherein a powered assembly causes the closure assembly to move from the closed position to the open position, and the powered assembly also causes the grille section to rotate relative to the hood section as the powered assembly is causing the closure assembly to move from the closed position to the open position.

In some aspects, the techniques described herein relate to a method, further including: rotating an electronic visual display mounted to an underside of the hood section such that the electronic visual display is substantially perpendicular to a ground surface.

In some aspects, the techniques described herein relate to a method, wherein the electronic visual display is rotated as the closure assembly moves from the closed position to the open position.

DETAILED DESCRIPTION

This disclosure relates to a front trunk including a closure providing increased headroom and shade. Among other benefits, which will be appreciated from the below description, the disclosed features increase the usability of the front trunk, and, in turn, the vehicle overall. In particular, many of the features discussed below are intended to make the front trunk more usable at worksites, tailgating events, etc.

Figure 1:
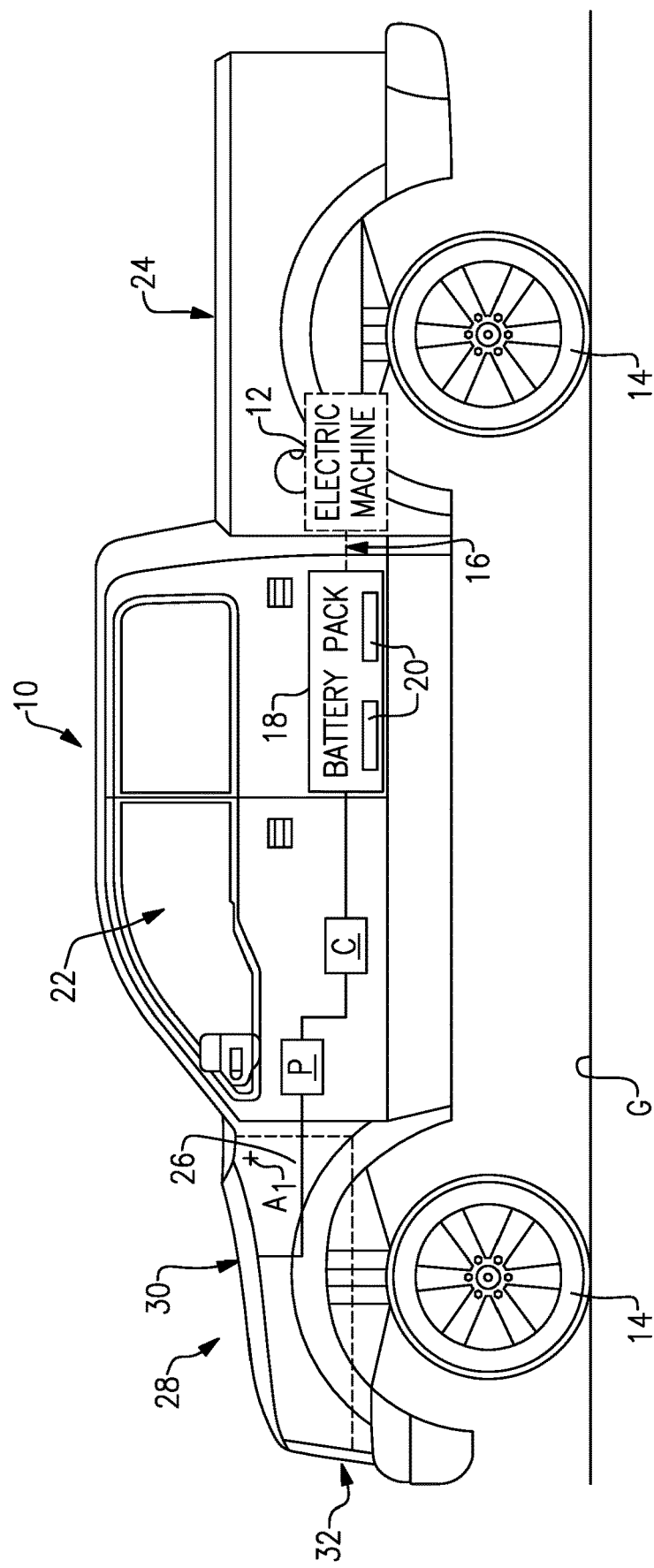
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 includes two sections, namely a hood section 30 and a grille section 32, that are moveable to cover and uncover the front trunk 26. The hood section 30 and grille section 32 may each include one or more panels. While the closure assembly 28 includes sections that provide the hood and grille of the vehicle 10, the entire closure assembly 28 could be referred to generally as a "hood" of the vehicle 10.

In the illustrated example, the hood section 30 provides a hood of the vehicle 10 and specifically covers the front trunk 26 from the top. The grille section 32 projects downward from a location adjacent a front edge of the hood section 30, and provides a grille of the vehicle 10. The grille section 32 covers the front trunk 26 from the front. The grille section 32 may be sized and shaped to match a grille in an engine-driven model of a vehicle, such as a pickup truck, in order to maintain the same look and allow for essentially the same front end vehicle body structure across a vehicle lineup. The grille section 32 exhibits solid surfaces configured to keep water out of the front trunk 26. In this example, the solid surfaces are feasible in the vehicle 10 because no air flow is needed for engine cooling.

Figure 2:
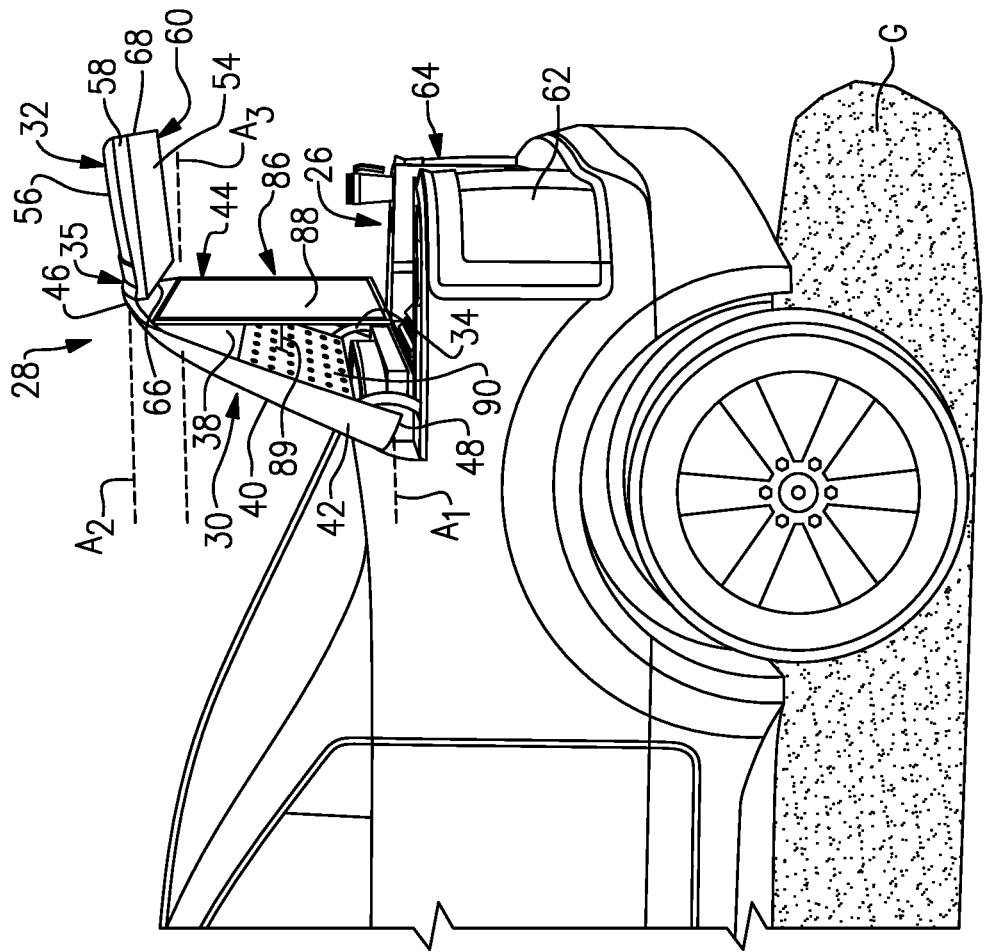
FIG. 2 is a perspective view of an exemplary front trunk of the electrified vehicle, with a closure assembly of the front trunk in an open position.

With reference to FIGS. 1 and 2, the hood section 30 and grille section 32 are rotatable together about the axis $A_1$ via a pair of hinges 34 to selectively cover (FIG. 1) and uncover (FIG. 2) the front trunk 26. When moving from the closed position (FIG. 1) to the open position (FIG. 2), the closure assembly 28 rotates generally upwardly and rearwardly. The hinges 34 may be provided by strand hinges, in which one of the strands is curved. The hinges 34 may alternatively be provided by another type of hinge, such as a barrel hinge, or a linkage, such as a four bar linkage.

The hood section 30 includes a first surface 38 and a second surface 40 opposite the first surface 38. When the hood section 30 is closed, the first surface 38 faces the front trunk 26, and therefore the first surface 38 may be referred to as an underside, or inner surface, of the hood section 30. The second surface 40 provides an exterior of the vehicle 10, and in particular provides a top of the hood section 30 in this example. When the hood section 30 is open, the first surface 38 may be referred to as a forward surface, and the second surface 40 may be referred to as a rear surface. The first and second surfaces 38, 40 extend laterally between opposed sides 42, 44, and also extend between edges 46, 48. When the hood section 30 is closed, the edge 46 is a front edge and the edge 48 is a rear edge. When the hood section 30 is open, the edge 46 may be referred to as a top edge and the edge 48 may be referred to as a bottom edge.

The grille section 32 is rotatably attached to the hood section 30, in this disclosure. Specifically, the grille section 32 is rotatable relative to the hood section 30 when the closure assembly 28 is not in the closed position, such as in a partially open or a fully open position, the latter of which may be referred to simply as an open position. The grille section 32 is rotatable about the axis $A_2$ via a hinged connection 35 located adjacent the first surface 38 and the edge 46. Axis $A_2$ is parallel to axis $A_1$, and axes $A_1$, $A_2$ are perpendicular to a centerline of the vehicle 10 in this example. The hinged connection 35 may be provided by a known type of hinge or linkage.

As shown in FIG. 2, the grille section 32 includes a first surface 54 and a second surface 56 opposite the first surface 54. When the closure assembly 28 is in the closed position, the first surface 54 faces the front trunk 26 and may be referred to as an inner surface. When the closure assembly 28 is in the open position, the first surface 54 may be referred to as a bottom surface of the grille section 32, and the second surface 56 may be referred to as a top surface of the grille section 32. The second surface 56 provides an exterior of the grille of the vehicle 10. The first and second surfaces 54, 56 extend laterally between opposed sides 58, 60, which in this example fit between opposed headlamps 62, 64. The first and second surfaces 54, 56 also extend between edges 66, 68. When the closure assembly 28 is closed, the edge 66 is a top edge and the edge 68 is a bottom edge. When the closure assembly 28 is open, the edge 66 may be referred to as a rear edge and the edge 68 may be referred to as a forward edge.

The hinged connection 35 is arranged adjacent second surface 56 and top edge 66, such that a portion of the edge 66 rearward of the second surface 56 can rotate relative to the hood section 30 about axis $A_2$. Specifically, hinged connection 35 is located adjacent an intersection of the second surface 56 and the edge 66, and adjacent an intersection of the first surface 38 and the edge 46. The hinged connection 35 could be located at another location along the top edge 66, however.

The closure assembly 28 is moveable between the closed and open positions by a powered assembly P (FIG. 1) in this example. The powered assembly P can include one or more powered actuators, gears, and/or linkages configured to move the closure assembly 28 between the closed and open positions automatically and without requiring a user to apply force to move the closure assembly 28. The powered assembly P includes a mechanical connection permitting the powered assembly P to rotate the grille section 32 about axis $A_2$. The powered assembly P could include a linkage or geared relationship, for example, such that movement of the closure assembly 28 to the open position also causes a corresponding rotation of the grille section 32, as discussed below. A user could initiate opening and/or closing of the closure assembly 28 by initiating an open or close command on a keyfob, on mobile device of the user, by a button on an exterior of the vehicle 10, and/or by a user interface in the passenger cabin 22. The actuator(s) of the powered assembly P can hold the closure assembly 28 in the open and closed positions. Alternatively or additionally, the hinge 34 and hinged connection 35 may cooperate with one or more detents and/or releasable latches configured to hold the closure assembly 28 in the open and closed positions. For instance, the edge 68 could include a releasable latch or projection configured to engage a corresponding projection or latch in a body of the vehicle 10 to hold the closure assembly 28 in the closed position. While a powered assembly P is mentioned, the closure assembly 28 could be configured to open and close manually without use of the powered assembly P.

Further, the vehicle 10 includes a controller C (FIG. 1) that can be part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. The controller C can issue commands to the powered assembly P, which is responsive of those commands to initiate corresponding movements of the closure assembly 28, as one example.

Figure 3:
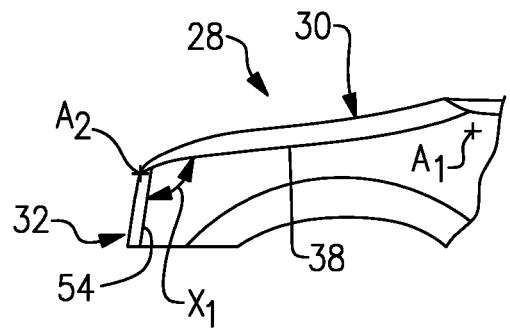
FIG. 3 is a somewhat schematic side view representative of the exemplary front trunk with the closure assembly in a closed position.

An exemplary movement of the closure assembly 28 from the closed position (FIG. 3) to the open position (FIG. 5) will now be described with reference to FIGS. 3-5, which somewhat schematically illustrate the closure assembly 28. In FIG. 3, the closure assembly 28 is in the closed position. When in the closed position, the closure assembly 28 seals and protects the interior of the front trunk 26 from the outside environment. In this position, the grille section 32 projects from the hood section 30 at a first angle $X_1$ measured from the first surface 38 of the hood section 30 to the first surface 54 of the grille section 32. In one example, the first angle $X_1$ is substantially 90°.

Figure 4:
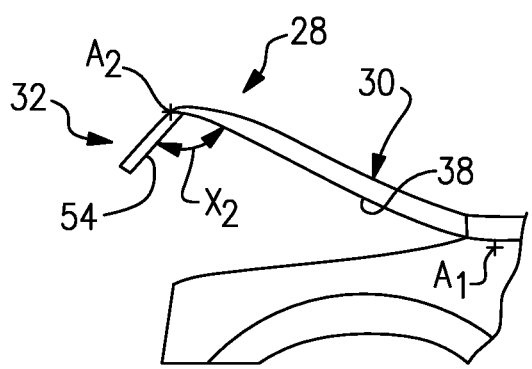
FIG. 4 is a somewhat schematic side view representative of the exemplary front trunk with the closure assembly between the open and closed positions.

FIG. 4 illustrates the closure assembly 28 in a partially open position, and specifically represents the closure assembly 28 as the closure assembly 28 moves from the closed position to the open position. The open position can be referred to as a "fully open" position to contrast with partially open positions, such as that of FIG. 4. In this position, the closure assembly 28 has rotated upwardly and rearwardly about axis $A_1$, and the grille section 32 has begun to rotate about the axis $A_2$ in a direction away from the ground surface G (FIG. 1), which is generally an upward direction and is clockwise with reference to FIG. 4, such that the grille section 32 projects from the hood section 30 at a second angle $X_2$ measured from the first surface 38 to the first surface 54. The ground surface G is the surface immediately under the wheels 14 of the vehicle 10, and may be concrete, pavement, grass, dirt, etc. The second angle $X_2$ is greater than the first angle $X_1$. The powered assembly P causes the closure assembly 28 to move from the closed position to the partially open position, in this example, and in particular the powered assembly P also causes the grille section 32 to rotate about axis $A_2$ while the closure assembly is rotating about axis $A_1$.

Figure 5:
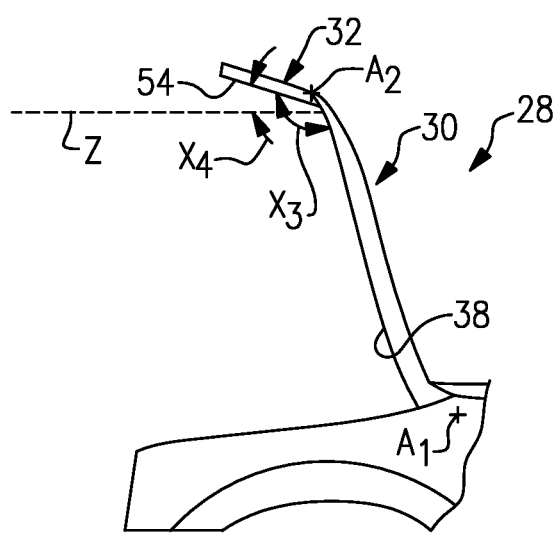
FIG. 5 is a somewhat schematic side view representative of the exemplary front trunk with the closure assembly in the open position.

FIG. 5 illustrates the closure assembly 28 in the open position, which again may be referred to as the "fully open" position. In this example, when the closure assembly 28 is in the open position, the grille section 32 projects from the hood section 30 at a third angle $X_3$ measured from the first surface 38 to the first surface 54. The third angle $X_3$ is greater than the first and second angles $X_1$, $X_2$. When in the open position of FIG. 5, the grille section 32 has rotated additionally about axis $A_2$ in a direction away from the ground surface G (again, which is generally an upward direction and clockwise relative to FIG. 5) relative to the position of FIG. 4. The third angle $X_3$ is greater than 90° in one example. In a further example, the third angle $X_3$ is greater than 90° and less than 180°. Further, in this example, the closure assembly 28 is configured such that the grille section 32 inclined at an acute angle $X_4$ above a plane Z extending parallel to the ground surface G. The angle $X_4$ is about 10° in one example, measured from the plane Z to the first surface 54. In the open position, the hood section 30 is inclined at between 60°-80° relative to the angle between first surface 38 and the ground surface G, and in one example is 70°.

In one embodiment of this disclosure, the powered assembly P is configured to gradually rotate the grille section 32 to the open position of FIG. 5 as the closure assembly 28 gradually rotates to the open position. In another example, the powered assembly P could rotate the grille section 32 about the axis $A_2$ after the hood section 30 and grille section 32 have been rotated about axis $A_1$. In that example, the hood section 30 and the grille section 32 would rotate about the axis $A_1$ until the hood section 30 is in the open position, and then the powered assembly P would initiate rotation of the grille section 32 about the axis $A_2$ until the hood section 30 and grille section 32 are in the position of FIG. 5. In another example, a user can manually rotate the grille section 32 about the axis $A_2$ relative to the hood section 30 to set a desired position of the grille section 32 when the closure assembly 28 is open.

Figure 6:
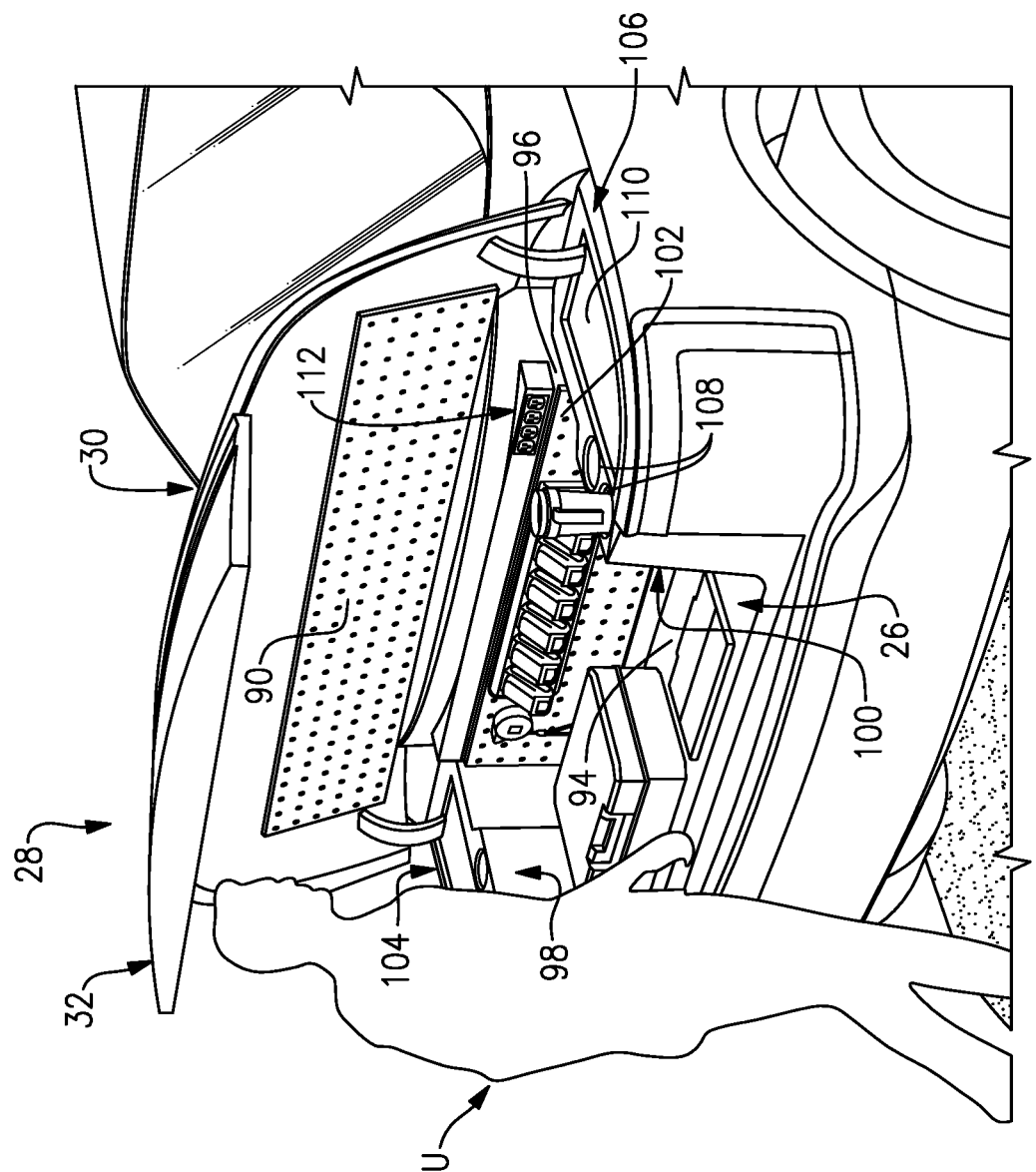
FIG. 6 is another perspective view of the exemplary front trunk with the closure assembly in the open position.

With the closure assembly 28 in the open position of FIG. 5, the grille section 32 may project slightly forward of a front of the front trunk 26. As such, rotating the grille section 32 away from the ground surface G about axis $A_2$ provides increased headroom and shade adjacent the front trunk 26. The term increased headroom refers to increased space in which to stand, sit, or move adjacent the front trunk 26, which in this disclosure is provided by the position of the grille section 32. With reference to FIG. 6, a user U is standing adjacent the front trunk 26. The user U is able to stand under the closure assembly 28 without contacting the closure assembly 28, namely the grille section 32, which permits the user U to stand closer to the front trunk 26 than the user U would otherwise be able to. This increases the ability of the user U to load and unload items stored within the front trunk 26. The user U can also readily avail himself or herself of the shade created by the closure assembly 28, and in particular the grille section 32, blocking sunlight without needing to crouch beneath the grille section 32.

Another aspect of this disclosure relates to a presentation of an electronic visual display 86 (FIG. 2), such as a television or computer monitor, which can display images and video for the enjoyment of users adjacent the front trunk 26, such as during tailgating or similar activities. In this example, the electronic visual display 86 is mounted to the first surface 38 of the hood section 30. When the closure assembly 28 is open, as in FIG. 2, the electronic visual display 86 is substantially perpendicular to a ground surface G, and in particular a screen 88 of the electronic visual display 86 is substantially perpendicular to the ground surface G, which increases the ease of viewing the electronic visual display 86. The term substantially when used to refer to angles of rotation is intended to be inclusive of acceptable tolerances, such as ±3°.

The electronic visual display 86 is mounted to the first surface 38 via a mount 89, which is illustrated schematically. The first surface 38 also includes a section including a mount, which in this example is perforated hardboard 90, to facilitate mounting one or more items to the first surface 38. In this example, the electronic visual display 86 is mounted indirectly to the perforated hardboard 90 via the mount 89. The perforated hardboard 90 can alternatively or additionally be used for the storage of tools and equipment, as examples. In one example, the perforated hardboard 90 is mounted to the first surface 38. The perforated hardboard 90 includes equally-spaced apart holes configured to receive standard sized pegs, hooks, or other adapters configured to mount and store various items. In another example, the first surface 38 is integrally formed with equally-spaced holes corresponding to those of perforated hardboard.

The electronic visual display 86 is rotatably attached to the first surface 38, via perforated hardboard 90 and mount 89, such that the electronic visual display 86 can rotate about axis $A_3$ adjacent a top of the electronic visual display 86. In an embodiment, rotation of the electronic visual display about axis $A_3$ is governed by the powered assembly P. The electronic visual display 86 may be configured to gradually rotate about axis $A_3$ as the closure assembly 28 moves from the closed position to the open position such that the electronic visual display 86 is substantially perpendicular to the ground surface G when the closure assembly 28 reaches the open position. In an example, when the closure assembly 28 is in the open position, the first surface 38 is inclined relative to the ground surface G by an angle of between 60-80°, and the electronic visual display 86 is configured to rotate between 10-30° about axis $A_3$. When the closure assembly 28 is in the closed position, the electronic visual display 86 is positioned substantially parallel to the first surface 38, under the power of the powered assembly P. In another example, a user could rotate the electronic visual display 86 manually. The positioning of the grille section 32 in this disclosure permits unimpeded viewing of the electronic visual display 86 while also providing shade adjacent the electronic visual display 86, which reduces glare on the electronic visual display 86.

The front trunk 26 includes a number of additional features that, in combination with the closure assembly 28 and in particular the configuration of the grille section 32, increase the usability of the front trunk 26. With reference to FIG. 6, the front trunk 26 includes a floor 94, a rear wall 96, and opposed lateral side walls 98, 100, which provide boundaries of the front cargo space of the vehicle 10. Various items, such as a toolbox and tablet, are resting on the floor 94, and various other items such as tools and chargers are attached to the rear wall 96.

The rear wall 96 includes a section including perforated hardboard 102. Various items, such as tools and chargers, are shown mounted to the perforated hardboard 102. The chargers could be connected to a power source of the vehicle 10. As with perforated hardboard 90, the perforated hardboard 102 can be used for the storage of tools and equipment, as examples. Further, the perforated hardboard 102 can be mounted to the rear wall 96 or, alternatively, the rear wall 96 can be integrally formed with equally-spaced holes corresponding to those of perforated hardboard. The perforated hardboard 102 includes equally-spaced apart holes configured to receive standard sized pegs, hooks, or other adapters configured to mount and store various items.

Laterally outward of the side walls 98, 100, side ledges 104, 106 are accessible and usable when the closure assembly 28 is open. The side ledges 104, 106 extend laterally from an upper portion of a respective one of the side walls 98, 100 to an exterior side of the vehicle 10, and otherwise generally exhibit a similar contour to the hood section 30 such that when the closure assembly 28 is closed, the hood section 30 overlaps and covers the side ledges 104, 106. In an example, the hood section 30 directly abuts the side ledges 104, 106 when the closure assembly 28 is closed. The side ledges 104, 106 are configured as useable spaces when the closure assembly 28 is open. With reference to side ledge 106, the side ledge 106 includes two cup holders 108 and a work surface 110. The side ledge 104 is configured similarly, but reflected about the centerline of the vehicle 10. The work surface 110 is substantially parallel to the floor 94 of the front trunk 26. The work surface 110 may be formed as a textured or finished surface configured to resist sliding of items places on the work surface 110. In this regard, the work surface 110 may be considered a storage tray. The work surface 110 could alternatively be configured to receive a rubber mat. The work surface 110 could alternatively or additionally be configured to include or receive a wireless charging pad configured to charge computing devices or mobile devices.

The front trunk 26 may also include various power outlets. In this example, the rear wall 96 includes four 120 Volt power outlets 112. The front trunk 26 could include a different number or type of power outlets, including 240 Volt power outlets, USB-C outlets, etc. The power outlets 112 can conveniently charge items such as tools, computing devices, or mobile devices that are being used relative to the front trunk 26. The front trunk 26 could include power outlets in additional locations other than what is shown in the figures.

In both embodiments, the various surfaces of the front trunk 26 and hood and grille sections 30, 32 may be made of a polymeric material. However, other materials, including metallic materials, are also contemplated within the scope of this disclosure.

The front trunk 26 could be fitted various work surfaces, including the surface 110, that could include one or more embossings that establish one or more measurement rulers for measuring items when positioned atop the work surface. Each of the work surfaces may include cup holders, storage trays, power outlets, etc. The front trunk 26 could also be fitted with various storage compartments and other features such as speakers for listening to music or other audio during tailgating, work, or other activities, and an interface for controlling the speakers. Any electronics, including power outlets, can be electrically connected to and powered by the battery pack 18. The controller C can selectively direct power to the power outlets 112, charge power tools mounted to the perforated hardboard 90, 102, and/or command power assembly P (if present) to move the closure assembly 28 and the electronic visual display 86, among other functions.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a front trunk establishing a cargo space; and
a closure assembly configured to move between a closed position and an open position to selectively cover and uncover the front trunk, wherein the closure assembly includes a hood section and a grille section, wherein, when the closure assembly is not in the closed position, the grille section is rotatable relative to the hood section in a direction away from a ground surface and wherein an electronic visual display is mounted to an underside of the hood section.

2. The motor vehicle as recited in claim 1, wherein the grille section is rotatable relative to the hood section while the closure assembly is moving between the closed and open positions.

3. The motor vehicle as recited in claim 1, wherein the grille section is rotatable relative to the hood section about an axis adjacent a front edge of the hood section.

4. The motor vehicle as recited in claim 1, wherein the grille section is rotatable about an axis substantially parallel to the ground surface.

5. The motor vehicle as recited in claim 1, wherein, when the closure assembly is in the closed position, the grille section projects from the hood section at a first angle measured from an inner surface of the hood section to an inner surface of the grille section.

6. The motor vehicle as recited in claim 5, wherein the first angle is substantially 90°.

7. The motor vehicle as recited in claim 5, wherein, when the closure assembly is in the open position, the grille section projects from the hood section at a second angle greater than the first angle, wherein the second angle is measured from the inner surface of the hood section to the inner surface of the grille section.

8. The motor vehicle as recited in claim 7, wherein the second angle is greater than 90°.

9. The motor vehicle as recited in claim 8, wherein the second angle is less than 180°.

10. The motor vehicle as recited in claim 8, wherein the grille section is inclined at an acute angle above a plane extending parallel to a ground surface.

11. The motor vehicle as recited in claim 10, wherein the grille section is inclined at an angle of about 10° measured from the plane to the inner surface of the grille section.

12. The motor vehicle as recited in claim 8, wherein:
a powered assembly is configured to cause the closure assembly to move from the closed position to the open position, and
the powered assembly is also configured to cause the grille section to rotate from the first angle to the second angle as the powered assembly is causing the closure assembly to move from the closed position to the open position.

13. The motor vehicle as recited in claim 12, wherein:
the electronic visual display is rotatably mounted to the underside of the hood section, and
the powered assembly is also configured to cause the electronic visual display to rotate such that the electronic visual display is substantially perpendicular to a ground surface as the powered assembly is causing the closure assembly to move from the closed position to the open position.

14. The motor vehicle as recited in claim 1, wherein the motor vehicle is a battery electric vehicle.

15. A method, comprising:
moving a closure assembly from a closed position to an open position to uncover a front trunk of a motor vehicle; and
rotating a grille section of the closure assembly relative to a hood section of the closure assembly in a direction away from a ground surface when the closure assembly is not in the closed position. wherein an electronic visual display is mounted to an underside of the hood section.

16. The method as recited in claim 15, wherein:
when the closure assembly is in the closed position, the grille section projects from the hood section at a first angle measured from an inner surface of the hood section to an inner surface of the grille section, and the step of rotating the grille section includes rotating the grille section such that the grille section projects from the hood section at a second angle greater than the first angle, wherein the second angle is measured from the inner surface of the hood section to the inner surface of the grille section.

17. The method as recited in claim 15, wherein the step of rotating the grille section occurs at least partially during the moving step.

18. The method as recited in claim 17, wherein a powered assembly causes the closure assembly to move from the closed position to the open position, and the powered assembly also causes the grille section to rotate relative to the hood section as the powered assembly is causing the closure assembly to move from the closed position to the open position.

19. The method as recited in claim 15, further comprising:
rotating the electronic visual display such that the electronic visual display is substantially perpendicular to a ground surface.

20. The method as recited in claim 19, wherein the electronic visual display is rotated as the closure assembly moves from the closed position to the open position.

* * * * *